United States Patent [19]
Albonetti et al.

[11] Patent Number: 5,686,381
[45] Date of Patent: Nov. 11, 1997

[54] MIXED V/SB/SN OXIDE AMMOXIDATION CATALYSTS

[75] Inventors: Stéfania Albonetti, Imola, Italy; Gilbert Blanchard, Le Plessis Belleville; Paolo Burattin, Paris, both of France; Fabrizio Cavani, Modena; Ferruccio Trifiro, Bologna, both of Italy

[73] Assignee: Rhone-Poulenc Chimie, Courbevoie Cedex, France

[21] Appl. No.: 494,185

[22] Filed: Jun. 23, 1995

[30] Foreign Application Priority Data

Jun. 23, 1994 [FR] France ................... 94 07982

[51] Int. Cl.⁶ .................. B01J 23/14; B01J 23/18; B01J 23/22
[52] U.S. Cl. ...................... 502/352; 502/353
[58] Field of Search ........................ 502/352, 353

[56] References Cited

U.S. PATENT DOCUMENTS

| | | | |
|---|---|---|---|
| 4,257,921 | 3/1981 | Slinkard et al. | 252/462 |
| 5,214,016 | 5/1993 | Brazdil et al. | 502/202 |

FOREIGN PATENT DOCUMENTS 2681850   4/1993   France ................ C01B 13/36

*Primary Examiner*—Glenn A. Caldarola
*Assistant Examiner*—Alexander G. Ghyka
*Attorney, Agent, or Firm*—Burns, Doane, Swecker & Mathis, L.L.P.

[57] ABSTRACT

Vanadium/antimony/tin mixed oxides having the empirical formula (I):

$$VSb_aSn_bO_x \qquad (I)$$

exhibit an X-ray diffraction pattern characteristic of a crystallographic phase of rutile $SnO_2$, are well suited as catalysts for the vapor phase ammoxidation of alkanes, and are conveniently prepared by (a) dissolving respective compounds of vanadium, antimony and tin in at least one saturated alcohol, (b) intimately contacting the alcoholic solution thus obtained with an aqueous solution containing an ammonium salt, thus precipitating the mixed oxides therefrom, and (c) separating and calcining these mixed oxides.

17 Claims, 1 Drawing Sheet

MIXED V/SB/SN OXIDE AMMOXIDATION CATALYSTS

BACKGROUND OF THE INVENTION

1. Technical Field of the Invention

The present invention relates to the mixed oxides of vanadium, antimony and tin characterized by a crystalline phase of rutile $SnO_2$, to a process for the preparation thereof and to the use of such mixed oxides as catalysts for the ammoxidation of alkanes.

2. Description of the Prior Art

Certain mixed oxides of vanadium and antimony or of vanadium, antimony and tin are known to this art. Thus, FR-A-072,334 describes a process for the preparation of a nitrile by ammoxidation of an alkane, in the presence of a catalytically effective amount of various mixed metal oxides, including vanadium, antimony and tin oxides. These mixed oxides are obtained by mixing the various oxides in aqueous suspension and then by evaporation of the water, or filtration of the suspended solids.

U.S. Pat. No. 5,214,016 describes a different process for preparing mixed oxides of vanadium, antimony and tin, entailing preparing an aqueous suspension of a mixture of the compounds of the elements which will be present in the mixed oxides and then calcining the mixture, the novel aspect of this process being the use, as the tin compound, of a stannous salt of a saturated acyclic monocarboxylic acid having from 1 to 18 carbon atoms.

These prior art processes provide mixed oxides which are useful as catalysts for the ammoxidation of alkanes.

Nonetheless, the catalytic activity of such mixed oxides is less than optimum.

SUMMARY OF THE INVENTION

Accordingly, a major object of the present invention is the provision of improved mixed oxide catalysts containing vanadium, antimony and tin, corresponding to the general empirical formula (I):

$$VSb_aSn_bO_x \quad (I)$$

in which a is a whole or fractional number equal to or greater than 0.1, b is a whole or fractional number equal to or greater than 0.5, x is a whole or fractional number determined by the oxidation states of the other elements, said mixed oxides exhibiting an X-ray diffraction pattern characteristic of a crystallographic phase of rutile $SnO_2$.

DETAILED DESCRIPTION OF BEST MODE AND PREFERRED EMBODIMENTS OF THE INVENTION

Figure 1:
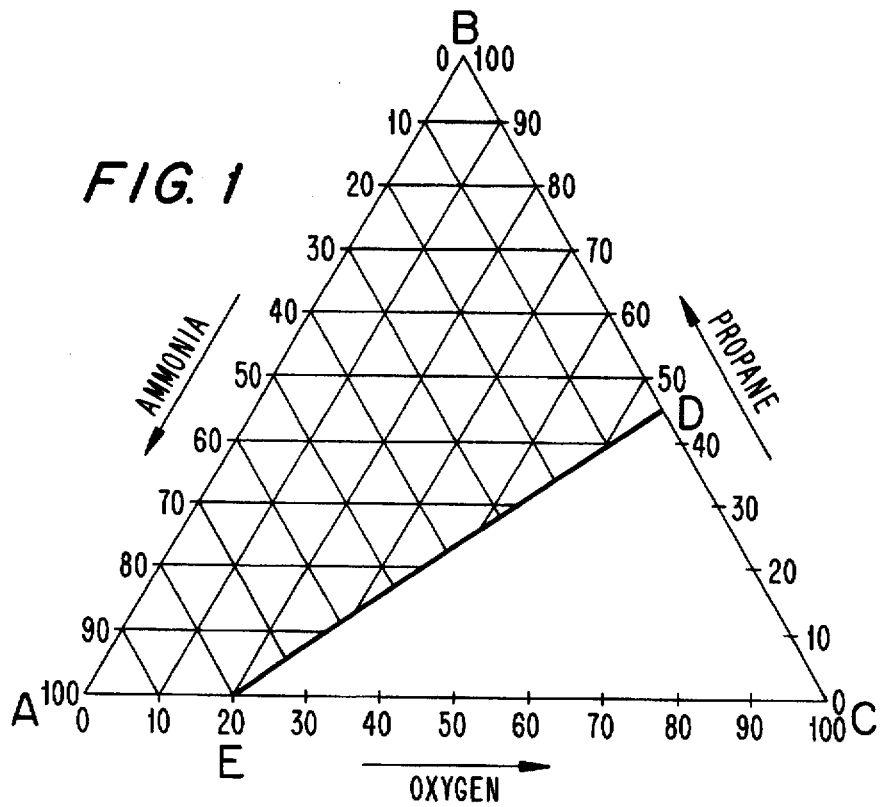

More particularly according to the present invention, characterization of the crystallographic rutile $SnO_2$ phase is carried out by X-ray diffraction analysis, the pattern characteristic of the phase of rutile $SnO_2$ corresponding to the following lattice parameters or spacings d (in Å):

3.33–3.35
2.62–2.64
2.37–2.38
1.74–1.76
1.66–1.67
1.57–1.59
1.48–1.50
1.40–1.43

Among such mixed oxides of formula (I), preferred are those in which:

a is a whole or fractional number equal to or less than 100,
b is a whole or fractional number equal to or less than 100,
x is a whole or fractional number determined by the oxidation states of the other elements.

More particularly preferred are the mixed oxides of general formula (I) in which:

a is a whole or fractional number ranging from 0.5 to 50,
b is a whole or fractional number ranging from 1 to 40,
x is a whole or fractional number determined by the oxidation states of the other elements.

The present invention also features a process for the preparation of a mixed oxide of general formula (I) comprising:

(a) dissolving respective vanadium, antimony and tin compounds in at least one saturated alcohol, (b) contacting the alcoholic solution thus obtained with an aqueous suspension containing an ammonium salt, in order to precipitate the mixed oxides, and (c) separating and calcining said mixed oxide.

The vanadium, antimony and tin compounds employed in the subject process must be soluble in a saturated alcohol or a mixture of saturated alcohols. According to this invention, a compound is considered soluble when its solubility, measured at 25° C., is at least 5 grams per liter of saturated alcohol. These compounds can be introduced together; they can also be introduced separately in an alcohol, the various alcoholic solutions thus obtained then being admixed with each other. Generally, an alcoholic solution is prepared by dissolving the various compounds, without intermediate preparation of solutions of each of the vanadium, antimony and tin compounds.

Exemplary soluble vanadium compounds include vanadyl acetylacetonate, vanadyl trichloride, vanadium trifluoride, vanadium tetrafluoride, vanadium pentafluoride, vanadium tribromide, vanadium dichloride, vanadium trichloride, vanadium tetrachloride and vanadium triiodide.

Exemplary soluble antimony compounds include antimony pentachloride, antimony trichloride, antimony tribromide, antimony trifluoride, antimony triiodide, antimony trioxide and stibine.

And exemplary soluble tin compounds include stannic chloride, stannous chloride and stannous bromide.

The saturated alcohols used in the process of the invention are more advantageously alkanols and cycloalkanols. Alkanols and cycloalkanols whose boiling points are not excessively high are the preferred, in order to facilitate the operations of separation or of recycling by distillation or evaporation. Thus, alkanols having from 1 to 6 carbon atoms, such as methanol, ethanol, n-propanol, 2-propanol, n-butanol, 2-butanol, tert-butanol, pentanols and hexanols, and cyclohexanol are more preferred.

The alcoholic solution thus obtained is then mixed with water, to precipitate the mixed oxides. This operation is preferably carried out in an aqueous solution of an ammonium salt, in particular an ammonium carboxylate (for example, acetate, citrate or tartrate), ammonium oxalate, ammonium carbonate or ammonium hydrogenphosphate, which permits attaining a pH of from 5 to 9 and preferably in the region of 7. Thus, ammonium acetate at a concentration of two moles per liter in water has a pH of about 7.

To maintain the value of the pH of the solution preferably at a value in the region of 7, it may be necessary to progressively neutralize the acidity possibly formed during the precipitation of the mixed oxides (for example, hydrohalic acid formed when an antimony halide and/or a tin halide and/or a vanadium halide is/are used) using a basic compound. It is preferable, in the process of the invention, to carry out this neutralization by controlled progressive addition of aqueous ammonia.

After precipitation of the mixed oxides of the invention, they are separated from the saturated alcohol/water liquid by any technique conventional; for this type of operation, in particular by filtration. The isolated mixed oxides are then dried, at atmospheric pressure or at reduced pressure, at a temperature ranging, for example, from 30° C. to 200° C., albeit these values are not critical.

The mixed oxides of formula (I) are then calcined at a temperature ranging from 400° C. to 800° C. The calcination is preferably carried out at a temperature of 500° C. to 750° C.

The present invention also features a process for the ammoxidation of alkanes, in the vapor phase, in the presence of a catalytically effective amount of a solid catalyst containing at least one active phase, said at least one active phase comprising at least one mixed oxide corresponding to the above general empirical formula (I).

According to the present invention, alkanes having from 3 to 12 carbon atoms per molecule are reacted in the vapor phase with ammonia and oxygen in the presence of a catalyst whose active phase is as above indicated.

It is of course possible to employ diluent gases which are inert under the conditions of reaction, such as helium, nitrogen and argon. Likewise, steam can be added to the gaseous reaction mixture in amounts which can vary over wide limits. The reactive gas (alkane, ammonia, oxygen) can thus be diluted with an inert diluent and/or with steam. The content of steam can vary over wide limits, in particular from 0% to 50% and, preferably, from 3% to 30%. In a preferred embodiment of the invention, the content of reactive gas will be at least 3% and preferably at least 20%.

Within the reactive gas, the respective contents of alkane, ammonia and oxygen can vary over wide limits.

The alkane content in the reactive gas preferably ranges from 5% to 70%. The ammonia content preferably ranges from 3% to 50% and the oxygen content preferably ranges from 3% to 45%. In another preferred embodiment of the invention, the composition of the reactive mixture will be outside the explosive region. With respect to the ammoxidation of propane in the absence of inert diluent, the composition (propane, oxygen, ammonia) will advantageously be selected from within the quadrilateral ABDE which appears in the ternary diagram ABC represented in the accompanying FIG. 1.

In this ternary diagram, segment AB represents the ammonia content from 100% to 0%; segment BC represents the propane content from 100% to 0%; segment CA represents the oxygen content from 100% to 0%. Point D, situated on segment BC, corresponds to a propane content of 45% in the binary system (propane/$O_2$); point E, situated on segment AC, corresponds to an ammonia content of 79% in the binary system (ammonia/$O_2$).

Segment DE delimits the ternary diagram as two parts: a triangle CDE within which is situated the explosive region (determined at 1 bar and at 25° C.) and a quadrilateral ABDE within which the composition of the reactive gaseous mixture will advantageously be selected.

With respect to the ammoxidation of propane in the presence of inert diluent gas(es) and/or of steam, it is advisable to determine the composition of the ternary mixture (propane, oxygen and ammonia) in order to situate it on the aforesaid diagram, when the diluent gas and/or the steam is in low proportion.

Figure 2:
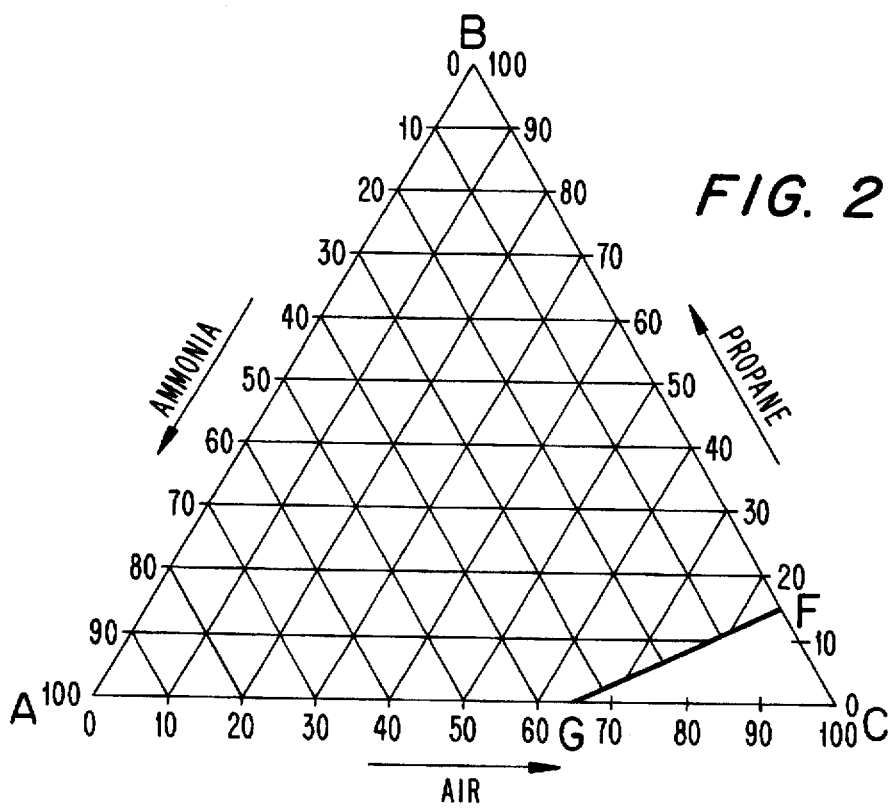

As regards the ammoxidation of propane by means of air as the oxygen source, the composition (propane, air and ammonia) will advantageously be selected within the quadrilateral ABFG which is within diagram ABC represented in the accompanying FIG. 2.

In this second diagram, segment AB represents the ammonia content from 100% to 0%; segment BC represents the propane content from 100% to 0%; segment CA represents the air content from 100% to 0%. Point F, situated on segment BC, corresponds to a propane content of 16% in the binary system (propane/air); point G, situated on segment AC, corresponds to an ammonia content of 35% in the binary system (ammonia/air).

Segment FG delimits the ternary diagram as two parts: a triangle CFG within which is situated the explosive region (determined at 1 bar and at 500° C.) and a quadrilateral ABFG within which the composition of the reactive gaseous mixture will advantageously be selected.

This second diagram will be used in the event that the oxygen/diluent gas mixture corresponds to an oxygen content equivalent to that of air (≈21% oxygen), or in the event that this mixture is deficient in oxygen with respect to the air.

Starting from propane, a mixture will be obtained containing essentially propylene and acrylonitrile. Acrylonitrile is an intermediate produced industrially on a large scale. Propylene is a starting material traditionally used to produce acrylonitrile and various other intermediate compounds well known to this art.

From isobutane, a mixture will be obtained containing methacrylonitrile and isobutene or n-butenes.

The process according to the invention is more particularly suitable for the ammoxidation of propane.

If the alkane used is of technical quality or grade, it will not contain significant amounts of compounds containing sites of ethylenic unsaturation. Thus, the propane will generally contain only trace amounts of propylene, for example less than 10%.

The process according to the invention is carried out as a vapor phase reaction. Consequently, any apparatus or reactor suitable for carrying out ammoxidation or oxidation reactions in the vapor phase can be utilized. The process can be carried out continuously or noncontinuously, for example in a stationary bed or a fluidized bed.

The reaction temperature generally ranges from 300° C. to 550° C. and, preferably, from 400° C. to 500° C.

The total pressure of the reaction mixture can be greater than or equal to atmospheric pressure. It advantageously ranges from 1 to 6 bar and, preferably, from 1 to 4 bar.

The gas flow rate is established such that the hourly volume rate advantageously ranges from 100 to 36,000 $h^{-1}$ and, preferably, from 200 to 20,000 $h^{-1}$.

The hourly volume rate is defined as the total gas volume/ volume of the catalyst/hour ratio.

Of course, those skilled in this art can readily determine a compromise between the temperature, the gas flow rate, the precise nature of the catalyst and the various other parameters of the reaction, taking account of production objectives.

The catalyst used in the process for the ammoxidation of alkanes can comprise a single or a number of mixed vanadium, antimony and tin oxides described above, constituting the active phase of the catalyst, or can additionally comprise another inorganic oxide, such as, for example, alumina, silica, silica/alumina, zirconia, cerite, magnesia, titanium oxide or niobium oxide, on which the active phase is deposited or with which the active phase is mixed, by using various techniques known to this art, such as impregnation or slurry deposition.

The catalytic phase, whether comprising the active phase alone or the active phase deposited onto an inorganic oxide or mixed with said inorganic oxide, can be used in bulk form or in the particulate state. Therefore, it can be employed in the powder form or be shaped, for example as beads, spheres, pellets, extrudates or crushed particles, according to various known techniques.

For conducting the process in a stationary bed, these techniques can be, for example, pelleting or coating onto an inert substrate, or onto a ceramic or metal substrate of monolithic type.

For conducting the process in a moving bed or in a fluidized bed, the catalytic phase is generally formed by atomization, drying and calcination.

The catalytic phases can, for example, be shaped by compression, to produce pellets. These pellets can then optionally be crushed into fragments. The precise values of the pressure, diameter and thickness of the pellets and particle size of the fragments can be selected by those skilled in the art according to the pressure drop acceptable in the reactor.

In one embodiment of the preparation of the catalytic phase, in a single stage the synthesis of the active phase is carried out, as is its deposition onto an organic oxide, or admixture thereof with the inorganic oxide.

The catalytic phases can also be deposited onto an inert support, or coated thereon. The nature of this support is not critical as long as it is chemically inert with respect to the reactants under the reaction conditions selected.

Exemplary supports that are suitable for the preparation of catalysts according to the invention include silica, alumina, silica/alumina, sintered clay, carborundum, magnesia, magnesium silicate and diatomaceous earth. This support is preferably nonporous and is advantageously based on a refractory oxide in the particulate state, the most common support being clay-based. This support can, for example, comprise inert, complete, solid and rough clay beads having a diameter of from 0.5 to 6 mm. The precise value of the diameter of the beads can be selected as a function of the acceptable pressure drop in the reactor. This support can also be rendered nonporous by enamelling.

The support can also be a ceramic substrate, said substrate preferably being in the form of an inert and rigid structure of monolithic type comprising channels or ducts. Such supports are well known and are widely described in the literature. The substrates which are fabricated from a ceramic material are especially those comprising, as the principal material, cordierite, alumina, mullite, porcelain, and the carbides of boron or silicon.

This material can also be a metal substrate. Such substrates are well known to this art. Suitable metal substrates include, in particular, those obtained from iron, nickel and chromium alloys or those obtained from iron, chromium, aluminum and cobalt alloys, such as those marketed under the trademark Kanthal, or those obtained from iron, chromium, aluminum and yttrium alloys, marketed under the trademark Fecralloy. The metal can also be carbon steel or simple cast iron.

When a coated catalyst is used, the amount of catalytic phase, which can vary over wide limits, advantageously ranges from 1% to 50% and, preferably, from 5% to 35% by weight with respect to the support +catalytic phase combination.

Thus, certain catalysts, useful to carry out the process in a stationary bed, can be obtained by coating the crushed, intermediate or finished catalytic phase in a manner per se known to this art. The conventional technique entails depositing a layer of intermediate or finished catalytic phase around inert but rough beads. Once the beads are covered with the desired amount of the catalytic phase, they are dried with hot air at a temperature of 70° to 150° C. for at least 30 minutes and then introduced into an oven to calcine same at a temperature of from 300° to 600° C., preferably from 450° to 500° C., for at least 3 hours.

Certain catalysts which are useful for carrying out the process according to the invention in a moving bed or fluidized bed can be prepared via the technique, per se known to this art, of drying by atomization in a preferably nonreducing atmosphere. By such an operation, followed, if appropriate, by calcination at a temperature on the order of 400° to 800° C., powders are obtained which are spherical in shape and have a diameter of from 5 to 700 µm. Powders comprising at least 80% by weight of particles whose sizes range from 5 to 200 µm are preferred in the context of use in a fluidized bed.

The catalytic phase, alone or thus employed in the bulk form or in the particulate state, constitutes the catalyst.

The products of the reaction can be recovered from the effluent gases by any suitable means. For example, the effluent gases can be transferred into a condenser containing dilute sulfuric acid in order to neutralize the unreacted ammonia. The gases can then be transported through a refrigerated absorbing column to condense the acrylonitrile, acetonitrile and hydrocyanic acid, the uncondensed vapors principally containing unreacted propane, propylene, light hydrocarbons and, if appropriate, $CO_2$. The acrylonitrile and hydrocyanic acid can then be separated from the acetonitrile by distillation and the recovered acrylonitrile/hydrocyanic acid mixture can in turn be distilled to separate the acrylonitrile from the hydrocyanic acid.

In order to further illustrate the present invention and the advantages thereof, the following specific examples are given, it being understood that same are intended only as illustrative and in nowise limitative.

EXAMPLE 1

Preparation of the Mixed Oxide (A) Having the Empirical Formula $VSb_{3.3}Sn_{3.3}O_x$ A solution of 15 g of anhydrous $SnCl_4$, 4.57 g of vanadyl acetylacetonate and 17.22 g of $SbCl_5$ in 100 ml of absolute ethanol was first prepared.

The ethanolic solution was poured dropwise into 500 ml of an aqueous solution containing ammonium acetate (2 mol/liter) to provide an initial pH on the order of 7.0. During the precipitation of the mixed V, Sb and Sn oxides, the pH, which tended to decrease due to the release of hydrochloric acid, was maintained constant by addition of a concentrated aqueous ammonia solution (containing 30% by weight).

The precipitate thus formed was isolated by filtration, washed with water, dried for 12 h at 140° C. and then calcined for 3 h at 700° C.

The compound of formula $VSb_{3.3}Sn_{3.30}O_x$ thus obtained was then compressed under a pressure of 4,300 bars. Pellets having a diameter of 3 cm and a thickness of approximately 0.5 cm were then obtained. These pellets were crushed into fragments having a particle size ranging from 0.3 to 0.8 cm, constituting the catalyst (A) in accordance with the invention.

EXAMPLE 2

Preparation of the Mixed Oxide (B1) Having the Empirical Formula $VSb_5Sn_5O_x$

The mixed oxide (B1) was prepared according to the procedure described in Example 1, but using 3.05 g of vanadyl acetylacetonate and 17.22 g of antimony pentachloride.

EXAMPLE 3

Preparation of the Mixed Oxide (B2) Having the Empirical Formula VSb$_5$Sn$_5$O$_x$ The mixed oxide (B2) was prepared according to the same procedure as in Example 2, but the calcination was carried out for 3 h at 800° C. instated of 700° C.

EXAMPLES 4 TO 11

Preparation of Various Mixed Oxides According to the Invention

Various mixed oxides were prepared according to the procedure described in Example 1, but by using varying amounts of vanadyl acetylacetonate and of antimony pentachloride, or by calcining at a different temperature, or, alternatively, by employing another saturated alcohol.

The amounts of vanadyl acetylacetonate (VaAA) and of antimony pentachloride, the calcination temperature and the saturated alcohol employed are reported in Table 1 below for each Of the examples.

TABLE 1

| Example | VaAA | SbCl$_5$ | Calcination temp. | Alcohol Used | Mixed Oxide Formula | Reference |
|---|---|---|---|---|---|---|
| Ex. 4 | 1.52 g | 17.22 g | 700° C. | ethanol | VSb$_{10}$Sn$_{10}$O$_x$ | C |
| Ex. 5 | 0.76 g | 17.22 g | 700° C. | ethanol | VSb$_{20}$Sn$_{20}$O$_x$ | D |
| Ex. 6 | 0.76 g | 34.44 g | 700° C. | ethanol | VSb$_{40}$Sn$_{20}$O$_x$ | E |
| Ex. 7 | 0.76 g | 8.61 g | 700° | ethanol | VSb$_{10}$Sn$_{20}$O$_x$ | F |
| Ex. 8 | 3.05 g | 12.05 g | 700° C. | ethanol | VSb$_{3.5}$Sn$_5$O$_x$ | G1 |
| Ex. 9 | 3.05 g | 12.05 g | 800° C. | ethanol | VSb$_{3.5}$Sn$_5$O$_x$ | G2 |
| Ex. 10 | 3.05 g | 17.22 g | 700° C. | 2-butanol | VSb$_5$Sn$_5$O$_x$ | H |
| Ex. 11 | 15.25 g | 25.83 g | 700° C. | ethanol | VSb$_{1.5}$SnO$_x$ | I |

Characterization of the Mixed Oxides Prepared According to the Invention

The mixed oxides A, B1, B2, C, D, E, F, G, H and I according to the invention were characterized by X-ray diffraction using a diffractometer of Philips P1800 trademark in the measurement range 10° to 70° in 2θ. The characteristic lines of the different oxides were then compared with the characteristic lines of the pure compounds reported in the International Tables of X-ray Crystallography.

The diffractograms plainly demonstrated that these catalysts were composed of a rutile phase, the unit cell parameters of which were very similar to those of rutile SnO$_2$.

COMPARATIVE TEST 1

Preparation Via Prior Art Technique of the Mixed Oxide (J) Having the EMpirical Formula VSb$_{1.5}$Sn$_{0.18}$O$_x$ The mixed oxide of composition VSb$_{1.5}$Sn$_{0.18}$O$_x$ was prepared by coprecipitation in an aqueous medium.

Solutions of 2.7 g of anhydrous SnCl$_4$, of 15.25 g of vanadyl acetylacetonate and of 25.83 g of antimony pentachloride in hydrochloric acid were prepared separately. These three solutions were poured simultaneously and dropwise into a 2 mol per liter aqueous ammonium acetate solution (pH of 7.0). During the precipitation of the oxides, the pH was maintained constant by addition of a concentrated aqueous ammonia solution (containing 30% by weight).

The precipitate thus formed was isolated by filtration, washed, dried at 140° C. for 12 hours and then calcined for 3 hours at 700° C.

The compound of formula VSb$_{1.5}$Sn$_{0.18}$O$_x$ thus obtained was then compressed under a pressure of 4,300 bars. Pellets having a diameter of 3 cm and a thickness of approximately 0.5 cm were then obtained. These pellets were crushed into fragments having a particle size ranging from 0.3 to 0.8 cm, constituting the catalyst (J) not in accordance with the invention.

COMPARATIVE TEST 2

Preparation Via Prior Art Technique of the Mixed Oxide (L) Having the Empirical Formula VSb$_5$Sn$_5$O$_x$ The mixed oxide of composition VSb$_5$Sn$_5$O$_x$ was prepared by coprecipitation in aqueous medium.

Solutions of 15 g of anhydrous SnCl$_4$, of 3.05 g of vanadyl acetylacetonate and of 17.22 g of antimony pentachloride in hydrochloric acid were prepared. These three solutions were poured simultaneously and dropwise into a 2 mol per liter aqueous ammonium acetate solution (pH of 7.0). During the precipitation of the oxides, the pH was maintained constant by addition of a concentrated aqueous ammonia solution (containing 30% by weight).

The precipitate thus formed was isolated by filtration, washed, dried at 140° C. for 12 hours and then calcined for 3 hours at 700° C.

The compound of formula VSb$_5$Sn$_5$O$_x$ thus obtained was then compressed under a pressure of 4,300 bars. Pellets having a diameter of 3 cm and a thickness of approximately 0.5 cm were then obtained. These pellets were crushed into fragments having a particle size ranging from 0.3 to 0.8 cm, constituting the catalyst (L) not in accordance with the invention.

General Ammoxidation Procedure

The catalyst sample was heated, in advance, to a temperature of 150° C. on a test bench while purging with helium for 10 min., and it was then subjected to a gas flow, the composition of which is indicated below for each example and which contained propane, ammonia, oxygen, helium and, if appropriate, steam.

The total pressure of the reaction mixture, ranging from 1 to 6 bar, is also indicated below for each example.

The total gas flow rate was adjusted to provide an hourly volume rate (HVR) ranging from 100 to 36,000 h$^{-1}$, the precise value of which is indicated below for each example.

Volume of active phase: 25 cm$^3$.

The general principle for the ammoxidation of propane was the following:

(a) The catalyst was heated to a temperature $T_1$, for example 310° C., and, after stabilizing same for min at the temperature $T_1$, the composition of the mixture at the reactor outlet was determined by gas phase chromatography.

(b) The conversion percentages and the selectivities obtained on the catalyst examined at the inlet temperature $T_1$ were calculated using relationships of the type:

(i) conversion of propane (in mol %)=converted propane/introduced propane (ii) selectively in respect of acrylonitrile (in mol %)=propane converted to acrylonitrile/converted propane.

(c) The catalyst was then heated from 310° to 550° C. by increments of 20° C. and the conversion percentages and the selectivities were determined every min.

In the ammoxidation examples below, the following abbreviations are employed:

$DC(C_3H_8)$=conversion of propane $S(ACN)$=selectively toward acrylonitrile $S(ACN+C_3H_6)$=selectivity towards acrylonitrile and propylene $S(Ammox)$=selectivity towards acetonitrile, hydrocyanic acid and other ammoxidation byproducts.

The remainder to 100% of the selectivities correspond to the formation of CO and $CO_2$ and, optionally, methane, ethane and ethylene.

EXAMPLES 12 TO 19 AND COMPARATIVE TESTS 3 AND 4

Ammoxidation of Propane

Ammoxidation of propane was carried out, as described above, by using, as catalysts, active phases composed of the mixed oxides of the invention A, B1, B2, C, D, E, H and G1 and the oxides, not in accordance with the invention, J and L.

The specific conditions employed using catalysts A, B1, B2, H, G1, J and L were the following:

Hourly value rate =1,700 $h^{-1}$

Total pressure=1.3 bar

Composition by volume of the reaction mixture:

$C_3H_8$=25%

$NH_3$=10%

$O_2$=20%

He=45%

The specific conditions employed using catalysts C, D and E were the following:

Hourly value rate =1,200 $h^{-1}$
Total pressure=1.3 bar
Composition by volume of the reaction mixture:
$C_3H_8$=8%
$NH_3$=8%
$O_2$=20%
He=64%

The temperature conditions and the results obtained are reported in Table 2 below:

TABLE 2

| Examples | Catalyst Used | Reaction Temperature (°C.) | $CD(C_3H_8)$ (in %) | $S(ACN)$ (in %) | $S(ACN + C_3H_6)$ (in %) | $S(Ammox)$ (in %) |
|---|---|---|---|---|---|---|
| Example 12 | A | 410 | 15 | 39 | 47 | 20 |
| | | 430 | 21 | 45 | 49 | 16 |
| | | 450 | 27 | 43 | 47 | 10 |
| | | 470 | 27 | 41 | 45 | 9 |
| Example 13 | B1 | 410 | 9 | 58 | 68 | 20 |
| | | 430 | 12 | 57 | 64 | 21 |
| | | 450 | 15 | 60 | 65 | 15 |
| | | 470 | 20 | 54 | 57 | 9 |
| Example 14 | B2 | 410 | 9 | 46 | 55 | 28 |
| | | 430 | 21 | 45 | 49 | 16 |
| | | 450 | 25 | 43 | 47 | 11 |
| | | 470 | 24 | 41 | 45 | 9 |
| Example 15 | C | 410 | 10 | 34 | 34 | 44 |
| | | 430 | 15 | 48 | 48 | 25 |
| | | 450 | 19 | 43 | 43 | 10 |
| | | 470 | 30 | 36 | 36 | 8 |
| Example 16 | D | 410 | 7 | 35 | 35 | 48 |
| | | 430 | 11 | 47 | 47 | 37 |
| | | 450 | 19 | 45 | 45 | 35 |
| | | 470 | 21 | 43 | 43 | 16 |
| Example 17 | E | 410 | 4 | 43 | 43 | 57 |
| | | 430 | 7 | 58 | 58 | 36 |
| | | 450 | 9 | 55 | 55 | 35 |
| | | 470 | 12 | 58 | 58 | 23 |
| Example 18 | H | 410 | 18 | 44 | 45 | 28 |
| | | 430 | 27 | 51 | 57 | 12 |
| | | 450 | 23 | 47 | 52 | 9 |
| | | 470 | 26 | 49 | 54 | 7 |
| Example 19 | G1 | 410 | 22 | 28 | 33 | 9 |
| | | 430 | 23 | 37 | 41 | 7 |
| | | 450 | 26 | 44 | 48 | 4 |
| | | 470 | 24 | 42 | 46 | 4 |
| Comparative Test 3 | J | 410 | 22 | 30 | 35 | 12 |
| | | 430 | 25 | 37 | 40 | 9 |
| | | 450 | 23 | 34 | 38 | 7 |
| | | 470 | 22 | 32 | 40 | 5 |
| Comparative Test 4 | L | 410 | 8 | 41 | 47 | 32 |
| | | 430 | 16 | 37 | 42 | 14 |
| | | 450 | 22 | 40 | 43 | 11 |
| | | 470 | 23 | 45 | 48 | 9 |

EXAMPLE 20

The ammoxidation of propane was carried out, as described above, by employing, as the catalyst, the active phase composed of the mixed oxide of the invention B1.

The specific conditions employed were the following:

Hourly value rate=1,800 $h^{-1}$

Total pressure=1.3 bar

Composition by volume of the reaction mixture:

$C_3H_8$=30%
$NH_3$=10%
$O_2$=20%
$H_2O$=10%
He=30%

The temperature conditions and the results obtained are reported in Table 3 below:

TABLE 3

| Example | Catalyst Used | Reaction Temperature (°C.) | DC(C₃H₈) (in %) | S(ACN) (in %) | S(ACN + C₃H₆) (in %) | S(Ammox) (in %) |
|---|---|---|---|---|---|---|
| Example 20 | B1 | 410 | 3 | 62 | 65 | 12 |
| | | 430 | 4 | 64 | 69 | 8 |
| | | 450 | 8 | 66 | 72 | 9 |
| | | 470 | 11 | 67 | 73 | 8 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a vanadium/antimony/tin mixed oxide having the empirical formula:

$$VSb_aSn_bO_x \qquad (I)$$

in which a is a whole or fractional number equal to or greater than 0.1, b is a whole or fractional number equal to or greater than 0.5 and x is a whole or fractional number determined by the oxidation states of the other elements, said mixed oxide exhibiting an X-ray diffraction pattern characteristic of a crystallographic phase of rutile $SnO_2$ comprising (a) dissolving respective compounds of vanadium, antimony and tin in at least one saturated alcohol, (b) intimately contacting the alcoholic solution thus obtained with an aqueous solution containing an ammonium salt, thus precipitating said mixed oxides therefrom, and (c) separating and calcining this mixed oxide.

2. The process as defined by claim 1, the compound of vanadium comprising vanadyl acetylacetonate, vanadyl trichloride, vanadium trifluoride, vanadium tetrafluoride, vanadium pentafluoride, vanadium tribromide, vanadium dichloride, vanadium trichloride, vanadium tetrachloride, or vanadium triiodide.

3. The process as defined by claim 1, the compound of antimony comprising antimony pentachloride, antimony trichloride, antimony tribromide, antimony trifluoride, antimony triiodide, antimony trioxide, or stibine.

4. The process as defined by claim 1, the compound of tin comprising stannic chloride, stannous chloride, or stannous bromide.

5. The process as defined by claim 1, said at least one saturated alcohol comprising an alkanol or a cyclohexanol.

6. The process as defined by claim 5, said at least one saturated alcohol comprising an alkanol having from 1 to 6 carbon atoms, or cyclohexanol.

7. The process as defined by claim 1, said ammonium salt comprising an ammonium carboxylate, ammonium oxalate, ammonium carbonate or ammonium hydrogenphosphate.

8. The process as defined by claim 1, comprising maintaining the pH of the mixed solution at about 7 by progressively neutralizing the acidity developed during the precipitation of the mixed oxide with a basic compound.

9. The process as defined by claim 1, comprising calcining the mixed oxide at a temperature ranging from 400° C. to 800° C.

10. The process as defined by claim 9, comprising calcining the mixed oxide at a temperature ranging from 500° C. to 750° C.

11. An atomoxidation catalyst comprising, as the active catalytic phase therefor, a catalytically effective amount of the V/Sb/Sn mixed oxide prepared in accordance with the process of claim 11.

12. The ammoxidation catalyst as defined by claim 11, said active catalytic phase being deposited onto, or admixed with an inorganic support substrate.

13. The ammoxidation catalyst as defined by claim 11, comprising a powder, beads, spheres, pellets, extrudates, a monolith, or crushed particulates.

14. In a process for the vapor phase catalytic ammoxidation of an alkane, the improvement which comprises, as the catalyst therefor, the ammoxidation catalyst as defined by claim 11.

15. The ammoxidation process as defined by claim 14, said alkane comprising propane or isobutane.

16. The ammoxidation process as defined by claim 14, said vapor phase comprising from 5% to 70% of alkane, from 3% to 50% of ammonia, and from 3% to 45% of oxygen.

17. The ammoxidation process as defined by claim 16, carried out at a temperature ranging from 300° C. to 550° C.

* * * * *